United States Patent
Yoon et al.

(10) Patent No.: US 10,316,906 B2
(45) Date of Patent: Jun. 11, 2019

(54) METHOD FOR LEARNING TOUCH POINT OF TRANSMISSION

(71) Applicants: HYUNDAI MOTOR COMPANY, Seoul (KR); KIA MOTORS CORPORATION, Seoul (KR); Hyundai Autron Co., Ltd., Seongnam-si, Gyeonggi-do (KR)

(72) Inventors: Young Min Yoon, Hwaseong-si (KR); Joon Bae Kim, Seongnam-si (KR); Seong Jin Park, Suwon-si (KR)

(73) Assignees: HYUNDAI MOTOR COMPANY, Seoul (KR); KIA MOTORS CORPORATION, Seoul (KR); HYUNDAI AUTRON CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/827,434

(22) Filed: Nov. 30, 2017

(65) Prior Publication Data
US 2018/0347647 A1 Dec. 6, 2018

(30) Foreign Application Priority Data
May 30, 2017 (KR) .................. 10-2017-0067022

(51) Int. Cl.
*F16D 48/08* (2006.01)
*B60W 10/02* (2006.01)

(52) U.S. Cl.
CPC ............. *F16D 48/08* (2013.01); *B60W 10/02* (2013.01); *F16D 2500/1026* (2013.01); (Continued)

(58) Field of Classification Search
CPC ............. F16D 48/08; F16D 2500/1026; F16D 2500/10412; F16D 2500/3026;
(Continued)

(56) References Cited

U.S. PATENT DOCUMENTS

| 5,072,815 A * | 12/1991 | Jarvis | F16D 48/066 477/83 |
| 2010/0298089 A1 * | 11/2010 | Sah | B60K 6/365 477/5 |
| 2013/0296102 A1 * | 11/2013 | Banker | B60W 10/196 477/4 |

FOREIGN PATENT DOCUMENTS

| JP | 2009-191868 A | 8/2009 |
| JP | 5501083 B2 | 5/2014 |

(Continued)

*Primary Examiner* — Edwin A Young
(74) *Attorney, Agent, or Firm* — Brinks Gilson & Lione

(57) ABSTRACT

A method for learning a touch point of a transmission is disclosed. The method may include: moving a sleeve of a synchronizing device in a shift stage gear direction and calculating a predicted rotation speed based on an initial rotation speed and a rotation speed change rate of a transmission clutch; positioning a first point when a difference between an actual rotation speed and the predicted rotation speed occurs and positioning a second point when a difference value between the actual rotation speed and the predicted rotation speed reaches a set speed; calculating a determination time by subtracting a second time to move the sleeve from the first point to the second point from a first time to move the sleeve from the first point to a pre-stored touch point; and performing a correction and control on the touch point based on the determination time.

10 Claims, 4 Drawing Sheets

(52) U.S. Cl.
CPC .............. *F16D 2500/10412* (2013.01); *F16D 2500/3026* (2013.01); *F16D 2500/30812* (2013.01); *F16D 2500/5012* (2013.01)

(58) Field of Classification Search
CPC ... F16D 2500/5012; F16D 2500/50245; F16D 2500/50251; F16D 2500/50275; B60W 10/02; B60W 10/06
See application file for complete search history.

(56) References Cited

FOREIGN PATENT DOCUMENTS

| | | |
|---|---|---|
| KR | 10-1198788 B1 | 11/2012 |
| KR | 10-2014-0121947 A | 10/2014 |

\* cited by examiner

METHOD FOR LEARNING TOUCH POINT OF TRANSMISSION

CROSS REFERENCE TO RELATED APPLICATION

This application claims priority to and the benefit of Korean Patent Application No. 10-2017-0067022, filed on May 30, 2017, which is incorporated herein by reference in its entirety.

FIELD

The present disclosure relates to a method for controlling a transmission capable of improving gear shift responsiveness.

BACKGROUND

The statements in this section merely provide background information related to the present disclosure and may not constitute prior art.

In a transmission for transmitting engine power, an automated manual transmission that electronically controls a clutch and a gear of a manual transmission performs shifting of the gearbox side in order to perform the shifting and then performs shifting of a transmission clutch.

Here, the shifting of the gearbox side is performed by a synchronizing device that is driven by an electric motor or a hydraulic actuator.

That is, a synchronizer ring and a cone formed on the shift stage gear are rubbed with each other by moving the sleeve if the synchronizing device is driven to perform speed synchronization, and then the sleeve is further moved to be engaged with the shift stage gear tooth to perform the shifting.

Here, a point in time when the force control is performed on the sleeve to start engagement with the shift stage gear tooth is called a touch point, and since the sleeve before the touch point does not suffer from any resistance, the movement to the touch point is performed quickly.

However, we have discovered that if the touch point is higher than a control expectation point, the force control is performed from the point before the touch point and thus the shifting is performed slowly. Conversely, if the touch point is lower than the control expectation point, the force control may not be performed at the accurate point in time. Accordingly, it is important to figure out the touch point accurately.

The matters described as the background art have been provided only for assisting in the understanding for the background of the present disclosure and should not be considered as corresponding to the related art known to those skilled in the art.

SUMMARY

The present disclosure provides a method for learning a touch point of a synchronizing device more accurately by using a change in speed of a transmission clutch to figure out a touch point at which a sleeve of the synchronizing device goes through a force control to start to be engaged with a shift stage gear.

According to an exemplary form of the present disclosure, a method for learning a touch point of a transmission, includes: a first calculating step of moving, by a controller, a sleeve of a synchronizing device in a shift stage gear direction and calculating a predicted rotation speed NiRef based on an initial rotation speed NiStart and a rotation speed change rate DniStart of a transmission clutch; a step of positioning, by the controller, a first point which is a sleeve position at a point in time when a difference between an actual rotation speed Ni and the predicted rotation speed NiRef of the transmission clutch starts to occur and a second point which is a sleeve position at a point in time when a difference value between the actual rotation speed Ni and the predicted rotation speed NiRef reaches a set speed Ndiff, after the first calculating step; a second calculating step of calculating, by the controller, a determination time Tdiff which is a value obtained by subtracting a second time Tm taken to move the sleeve from the first point to the second point from a first time Te taken to move the sleeve from the first point to a pre-stored touch point, after the positioning step; and a correcting step of performing, by the controller, a correction and control on the touch point based on the determination time Tdiff, after the second calculating step.

The correcting step may include: a first comparing step of comparing, by the controller, the determination time Tdiff with a reference time; a second comparing step of comparing, by the controller, a distance Pdiff between the first point and the second point with a reference distance, after the first comparing step; a correction amount calculating step of calculating, by the controller, a correction amount of the touch point based on a result of performing the first and second comparing steps; and a correction amount learning step of correcting and controlling, by the controller, the touch point by applying the correction amount to the touch point, after the correction amount calculating step.

If the determination time Tdiff exceeds the reference time and the distance Pdiff between the first point and the second point exceeds the reference distance, the controller may calculate the correction amount for holding the touch point in the correction amount calculating step of the correcting step.

If the determination time Tdiff is equal to or less than the reference time and the distance Pdiff between the first point and the second point is equal to or less than the reference distance, the controller may calculate the correction amount for holding the touch point in the correction amount calculating step of the correcting step.

If the determination time Tdiff exceeds the reference time and the distance Pdiff between the first point and the second point is equal to or less than the reference distance, the controller may calculate the correction amount for moving down the touch point in the correction amount calculating step of the correcting step.

If the determination time Tdiff equal to or less than the reference time and the distance Pdiff between the first point and the second point exceeds the reference distance, the controller may calculate the correction amount for moving up the touch point in the correction amount calculating step of the correcting step.

In the correction amount calculating step of the correcting step, the controller may calculate the correction amount so as to be proportional to the determination time Tdiff.

After the correction amount learning step of the correcting step, the controller may calculate learning convergence that is a ratio of the correction amount and an actual correction amount of the touch point actually corrected, calculate a correction coefficient based on the learning convergence and the correction amount, and calculate the correction amount by applying the correction coefficient if the correction amount calculating step is performed again.

After the correction amount learning step of the correcting step, if an accelerator position sensor (APS) opening degree is smaller than a reference angle or an engine speed is smaller than a reference speed, the controller may calculate a previously mapped additional correction coefficient depending on the APS opening degree or the engine speed and apply the previously mapped additional correction coefficient when the correction amount calculating step is performed again to calculate the correction amount.

After the correction amount learning step of the correcting step, the controller may calculate the additional correction coefficient previously mapped depending on the target shift stage when manual shifting is performed and calculate the correction amount by applying the additional correction coefficient when the correction amount calculating step is performed again.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
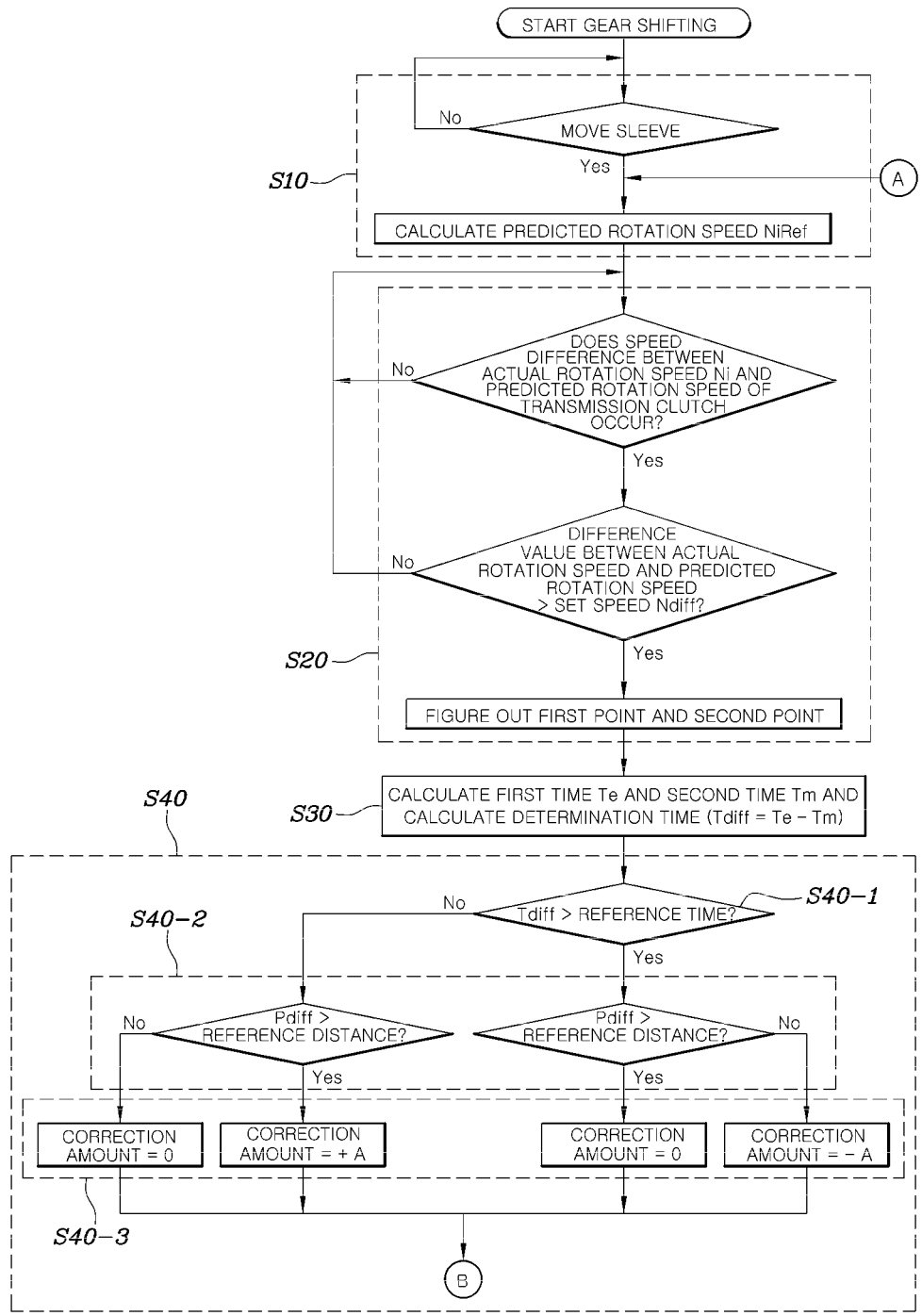
FIG. 1 is a flow chart illustrating a method for learning a touch point of a transmission according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
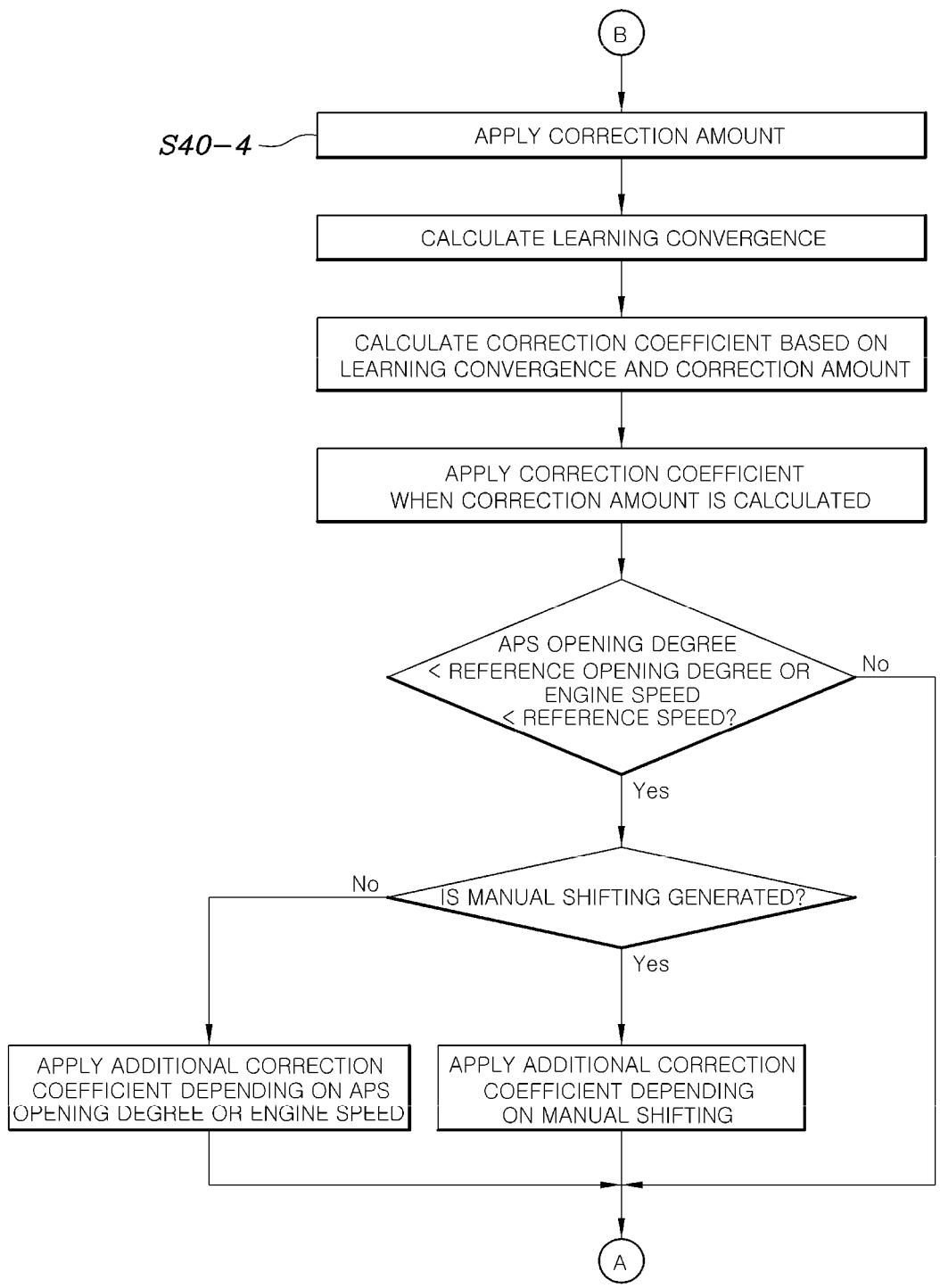
FIG. 2 is a flow chart illustrating in detail a correction step according to an exemplary form of the present disclosure.
Figure 3:
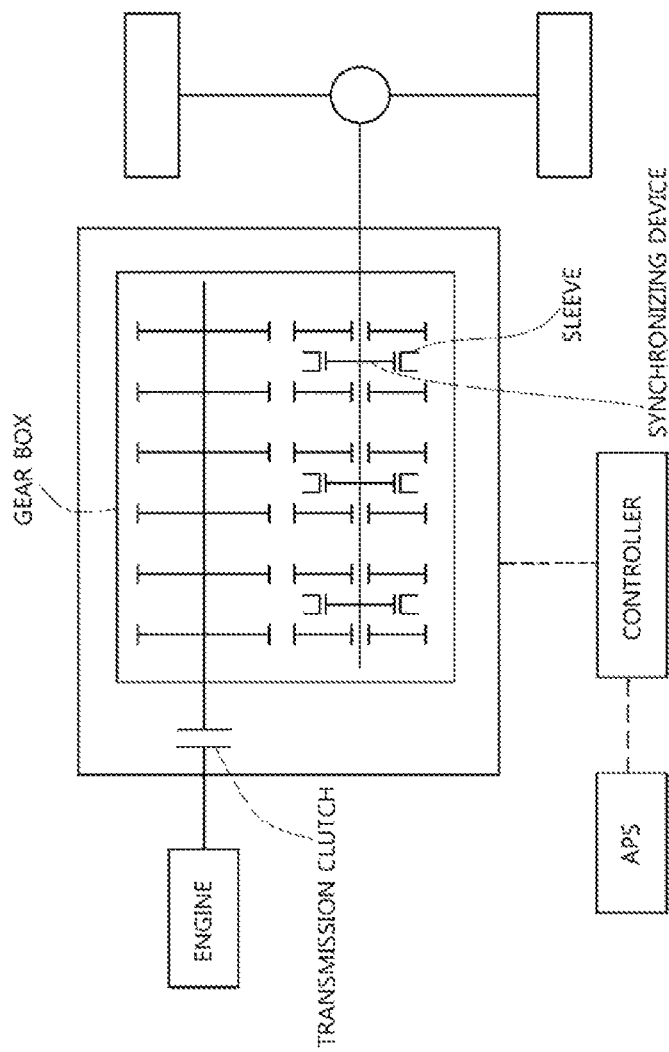
FIG. 3 is a diagram schematically illustrating an internal structure of a transmission according to an exemplary form of the present disclosure.
Figure 4:
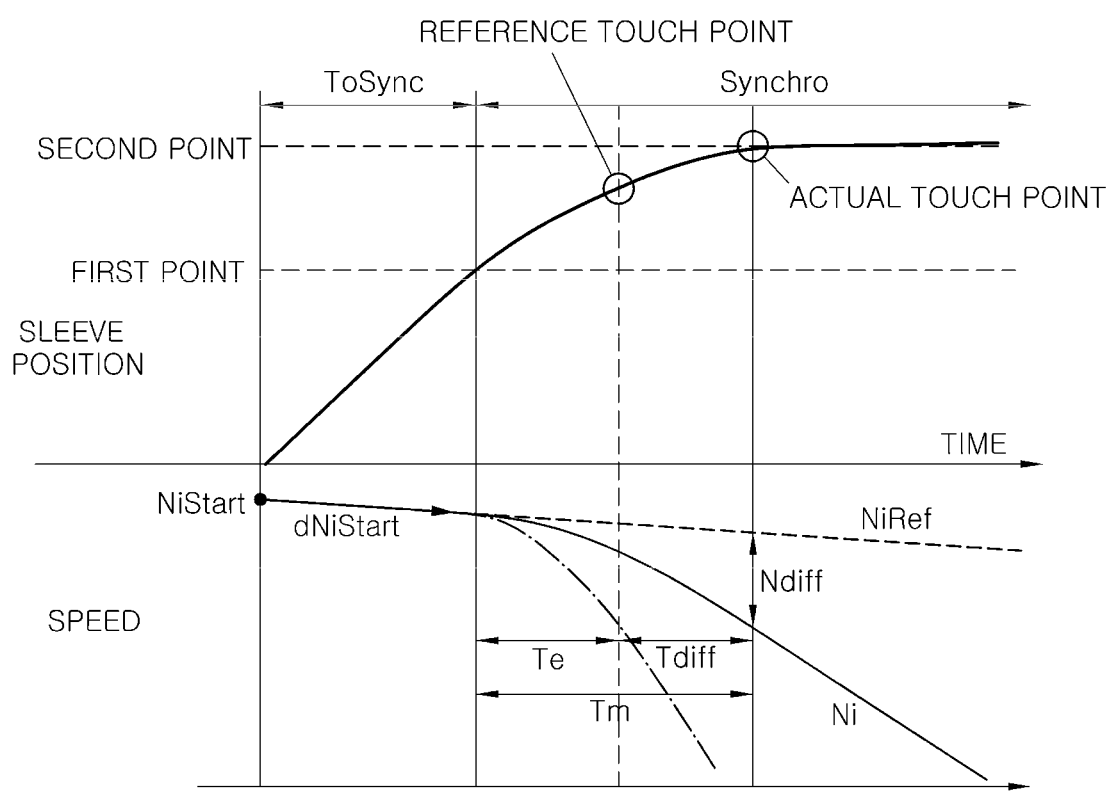
FIG. 4 is a graph illustrating learning of a touch point position depending on a sleeve moving position and a change in speed of a transmission clutch according to an exemplary form of the present disclosure.

FIG. 1 is a flow chart illustrating a method for learning a touch point of a transmission according to an exemplary form of the present disclosure, FIG. 2 is a flow chart illustrating in detail a correction step according to an exemplary form of the present disclosure, FIG. 3 is a diagram schematically illustrating an internal structure of a transmission according to an exemplary form of the present disclosure, and FIG. 4 is a graph illustrating learning of a touch point position depending on a sleeve moving position and a change in speed of a transmission clutch according to the present disclosure.

Referring to FIGS. 1 to 4, a method for learning a touch point of a transmission includes: a first calculating step (S10) of moving, by a controller, a sleeve of a synchronizing device in a shift stage gear direction and calculating a predicted rotation speed NiRef based on an initial rotation speed NiStart and a rotation speed change rate DniStart of a transmission clutch; a step (S20) of positioning, by the controller, a first point which is a sleeve position at a point in time when a difference between an actual rotation speed Ni and the predicted rotation speed NiRef of the transmission clutch starts to occur and a second point which is a sleeve position at a point in time when a difference value between the actual rotation speed Ni and the predicted rotation speed NiRef reaches a set speed Ndiff, after the first calculating step (S10); a second calculating step (S30) of calculating, by the controller, a determination time Tdiff which is a value obtained by subtracting a second time Tm taken to move the sleeve from the first point to the second point from a first time Te taken to move the sleeve from the first point to a pre-stored touch point, after the positioning step (S20); and a correcting step (S40) of performing, by the controller, a correction and control on the touch point based on the determination time Tdiff, after the second calculating step (S30).

As illustrated in FIG. 3, the controller according to the present disclosure controls a transmission provided between an engine and a differential apparatus. The transmission includes a transmission clutch that controls engine power to be transmitted to a gear box and a gear box that changes a gear ratio. At this time, a plurality of shift stage gears are provided in the gear box, and a synchronizing device connecting between the shift stage gear and an input shaft is provided.

In a vehicle to which an automated manual transmission is applied, if a driver steps on an accelerator pedal by more than a certain angle to request power-on shifting, the controller performs the shifting by applying a predetermined force to the targeted shift stage gear to move the sleeve of the transmission synchronizing device.

At this time, describing the process of moving the sleeve to the gear side of the shift stage gear, the sleeve moves to push the synchronizer ring, and the synchronizer ring is pushed to slip with the cone of the shift stage gear to start to perform speed synchronization between the sleeve and the shift stage gear. Up to this point, even if the sleeve moves, the transmission clutch rotates freely from the shift stage gear.

However, as the sleeves continue to move and the speed of the sleeve and the speed of the shift stage gear starts to be synchronized with each other, the transmission clutch is gradually synchronized with the shift stage gear to change the rotation speed.

The present disclosure is provided to accurately figure out the touch point which is the sleeve position where the speed synchronization between the sleeve and the shift stage gear is completed and a force control starts to be progressed, based on the change in rotation speed of the transmission clutch generated during the shifting.

Specifically, in order to determine whether or not the rotation speed of the transmission clutch is changed, the present disclosure sets the rotation speed when the transmission clutch freely rotates to be a reference value and determines the change in the rotation speed of the transmission clutch over time based on the reference value.

That is, as illustrated in FIG. 4, the controller measures an initial rotation speed NiStart which is the rotation speed of the transmission clutch at the point in time when the sleeve movement starts to be progressed due to the shifting request and measures a rotation speed change rate DniStart representing the change in the rotation speed to the time of the transmission clutch, thereby calculating a predicted rotation speed NiRef over time base on the initial rotation speed NiStart and the rotation speed change rate DNiStart (S10). The predicted rotation speed NiRef thus calculated becomes a reference value for determining whether the rotation speed of the transmission clutch is changed.

Next, the controller sets the sleeve position at the point in time when the difference between the actual rotation speed Ni and the predicted rotation speed NiRef of the transmission clutch starts to occur as the first point and sets the sleeve position at the point in time when the difference value between the actual rotation speed Ni and the predicted rotation speed NiRef reaches the set speed Ndiff as the second point (S20).

Here, even if the difference between the actual rotation speed Ni and the predicted rotation speed NiRef is generated by the set speed Ndiff, the set speed Ndiff is a value set so that the corresponding point becomes a section where the speed synchronization between the sleeve and the shift stage gear is progressed.

That is, even if the actual rotation speed Ni deviates from the predicted rotation speed NiRef, if the difference between the actual rotation speed Ni and the predicted rotation speed NiRef is within the set speed Ndiff, it may be determined that the sleeve is still being speed-synchronized with the shift stage gear, and if the difference reaches the set speed Ndiff, it may be determined that the speed synchronization has been completed and thus the difference has reached the touch point where the sleeve is engaged with the shift stage gear by the force control later.

This is due to the fact that the sleeve teeth are not drawn into the clutch gear teeth due to the torque difference between the sleeve and the clutch gear in the section where the sleeve is speed-synchronized with the clutch gear.

If the controller figures out all the first and second points by the positioning step (S20), the first time Te which is the time required to move the sleeve from the first point to the pre-stored touch point and the second time Tm which is the time taken to move the sleeve from the first point to the second point is calculated and the determination time Tdiff which is the value obtained by subtracting the second time Tm from the first time Te is calculated (S30).

Accordingly, the correlation between the pre-stored touch point and the actually measured touch point is calculated based on the determination time Tdiff, and the controller performs the correcting step (S40) of correcting the touch point based on the calculated determination time Tdiff to accurately perform the force control using the sleeve, thereby improving the gear shift responsiveness. At this time, the controller stores the corrected touch point so that the corrected touch point may be used in the second calculating step S30.

More specifically, referring to FIGS. 1 and 2, the correction step (S40) of the present disclosure includes a first comparing step S40-1 of comparing, by the controller, the determination time Tdiff with a reference time; a second comparing step (S40-2) of comparing, by the controller, a distance Pdiff between the first point and the second point with a reference distance after the first comparing step (S40-1); a correction amount calculating step (S40-3) of calculating, by the controller, a correction amount of the touch point based on a result of performing the first and second comparing steps (S40-1 and S40-2); and a correction amount learning step (S40-4) of correcting and controlling, by the controller, the touch point by applying the correction amount to the touch point after the correction amount calculating step (S40-3).

That is, if the determination time Tdiff is greater than the reference time, the controller may determine that the actually measured touch point is formed at a point in time earlier than the pre-stored touch point, and on the contrary, if the determination time Tdiff is less than the reference time, it may be determined that the pre-stored touch point is formed at a point in time later than the actually measured touch point.

Therefore, the controller can calculate the correction amount of the touch point based on the determination time Tdiff. Logic for determining whether to apply the correction amount according to the distance Pdiff between the first point and the second point, that is, the movement distance of the sleeve may be performed.

Describing in detail, as illustrated in FIG. 1, if the determination time Tdiff exceeds the reference time and the distance Pdiff between the first point and the second point exceeds the reference distance, the controller may calculate the correction amount for holding the touch point in the correction amount calculating step S40-3 of the correcting step S40.

That is, if the determination time Tdiff exceeds the reference time, the controller determines that the actually measured touch point is formed at a point in time earlier than the pre-stored touch point, and if the distance Pdiff between the first point and the second point is greater than the reference distance, the sleeve is controlled to sufficiently move to calculate the correction amount as 0, thereby reducing or inhibiting the phenomenon that the touch point is excessively learned or erroneously learned due to the excessive touch point correction.

In addition, if the determination time Tdiff is equal to or less than the reference time and the distance Pdiff between the first point and the second point is equal to or less than the reference distance, the controller may calculate the correction amount for holding the touch point in the correction amount calculating step S40-3 of the correcting step S40.

That is, if the determination time Tdiff is equal to or less than the reference time Tdiff and the distance Pdiff between the first point and the second point is equal to or less than the reference distance, the controller determines that the actually measured touch point is formed at a point in time later than the pre-stored touch point but the movement distance of the sleeve is excessively short, thereby calculating the correction amount as 0.

Meanwhile, if the determination time Tdiff exceeds the reference time and the distance Pdiff between the first point and the second point is equal to or less than the reference distance, the controller may calculate the correction amount for moving down the touch point in the correction amount calculating step S40-3 of the correcting step S40.

In addition, if the determination time Tdiff equals to or less the reference time and the distance Pdiff between the first point and the second point exceeds the reference distance, the controller may calculate the correction amount for moving up the touch point in the correction amount calculating step S40-3 of the correcting step S40.

That is, if the distance Pdiff between the first point and the second point is equal to or less than the reference distance while the determination time Tdiff exceeds the reference time, the controller forms the actually measured touch point at a point in time shorter than the pre-stored touch point, and it is determined that the movement distance of the sleeve may be further reduced, thereby calculating the correction amount of a negative (−) value so as to further move down the touch point.

To the contrary, if the distance Pdiff between the first point and the second point exceeds the reference distance while the determination time Tdiff is equal to or less than the reference time, the controller forms the actually measured touch point at a point in time later than the pre-stored touch point, and it is determined that the movement distance of the sleeve may be longer, thereby calculating the correction amount of a positive (+) value so as to further move up the touch point.

At this time, in the correction amount calculating step S40-3 of the correcting step S40, the controller may calculate the correction amount so as to be proportional to the determination time Tdiff.

Thereafter, as illustrated in FIG. 2, the controller may perform the correction amount learning step (S40-4) to precisely learn the touch point, such that the point in time when the sleeve force control is performed may be accurately figured out, thereby improving the shifting responsiveness.

FIG. 4 illustrates the case where the determination time Tdiff is equal to or less than the reference time, in which it may be determined that the actual touch point is formed at the point in time later than the pre-stored touch point.

Meanwhile, after the correction amount learning step (S40-4) of the correcting step (S40), the controller may calculate learning convergence that is a ratio of the correction amount and the actual correction amount of the touch point actually corrected, calculate a correction coefficient depending on the learning convergence and the correction amount, and calculate the correction amount by applying the correction coefficient if the correction amount calculating step S40-3 is performed again.

That is, even though the controller performs the correction amount learning step S40-4 to apply the correction amount to the touch point, the touch point learning may not be performed by the correction amount due to the influence of the rotation speed of the transmission clutch, gear lubricating oil temperature, a target gear, gear deflection or the like.

Therefore, the controller confirms the learning convergence indicating the ratio at which the touch point learning is performed. For example, if the touch point learning is not made by the correction amount, the learning convergence is confirmed as 0%, and if the touch point learning is completely made by the correction amount, the learning convergence may be confirmed as 100%.

For example, if the correction amount of the touch point calculated in the correction amount calculation step (S40-3) is 2 mm and the learning convergence is 0%, it is possible to increase the correction amount through the correction coefficient to induce the touch point correction to be performed. If the learning convergence is 50%, as compared to the case in which the learning convergence is 0%, the correction coefficient may be applied so that the amount by which the correction amount increases is reduced.

As another example, if the touch point correction amount calculated in the correction amount calculating step (S40-3) is slightly small as 0.05 mm, the correction coefficient may be applied so that the correction amount increases only when the learning convergence is 0 to 90%, and otherwise, the correction coefficients may not be applied. Therefore, it is possible to avoid frequent correction control performed to correct up to a fine touch point error.

The numerical values of the exemplary forms described above are merely illustrative for description, but may be set to be variable depending on vehicles or designers and therefore are not limited to specific numerical values.

Further, as illustrated in FIG. 2, after the correction amount learning step (S40-4) of the correcting step (S40), if an APS opening degree is smaller than the reference angle or an engine speed is smaller than the reference speed, the controller may calculate the previously mapped additional correction coefficient depending on the APS opening degree or the engine speed and may apply the additional correction coefficient when the correction amount calculating step (S40-3) is performed again to calculate the correction amount.

Further, after the correction amount learning step (S40-4) of the correcting step (S40), the controller may calculate the additional correction coefficient previously mapped depending on the target shift stage when the manual shifting is performed and may calculate the correction amount by applying the additional correction coefficient when the correction amount calculating step (S40-3) is performed again.

In the present disclosure, when the APS opening degree is equal to or greater than the reference angle and the engine speed is equal to or greater than the reference speed, the time required to determine the touch point is calculated by pushing the sleeve with the same force so that the touch point is learned based on the required time calculated.

However, if the APS opening degree is power off shifting lower than the reference angle or the engine speed is in a low state, learning of the touch point as in the present disclosure may generate gear noise and impact, such that the correction amount may be corrected based on the additional correction coefficient mapped depending on the APS opening degree and the engine speed. In addition, even when the forced manual shifting is generated by a driver, the correction amount of the touch point can be corrected and controlled by using the additional correction coefficient mapped depending on the corresponding shift stage.

According to the method for learning a touch point of a transmission having the above-described structure, the force control of the sleeve can be accurately determined by accurately determining the touch point of the transmission synchronizing device to improve the gear shift responsiveness.

Although the present disclosure has been shown and described with respect to specific exemplary forms, it will be obvious to those skilled in the art that the present disclosure may be variously modified and altered without departing from the spirit and scope of the present disclosure.

What is claimed is:

1. A method for learning a touch point of a transmission, comprising:
   a first calculating step of moving, by a controller, a sleeve of a synchronizing device in a shift stage gear direction and calculating a predicted rotation speed based on an initial rotation speed and a rotation speed change rate of a transmission clutch;
   a step of positioning, by the controller, a first point which is a sleeve position at a point in time when a difference between an actual rotation speed and the predicted rotation speed of the transmission clutch starts to occur and a second point which is a sleeve position at a point in time when a difference value between the actual rotation speed and the predicted rotation speed reaches a set speed, after the first calculating step;
   a second calculating step of calculating, by the controller, a determination time which is a value obtained by subtracting a second time taken to move the sleeve from the first point to the second point from a first time taken to move the sleeve from the first point to a pre-stored touch point, after the positioning step; and
   a correcting step of performing, by the controller, a correction and control on the touch point based on the determination time, after the second calculating step.

2. The method of claim 1, wherein the correcting step includes:

a first comparing step of comparing, by the controller, the determination time with a reference time;

a second comparing step of comparing, by the controller, a distance between the first point and the second point with a reference distance, after the first comparing step;

a correction amount calculating step of calculating, by the controller, a correction amount of the touch point based on a result of performing the first and second comparing steps; and a correction amount learning step of correcting and controlling, by the controller, the touch point by applying the correction amount to the touch point, after the correction amount calculating step.

3. The method of claim 2, wherein when the determination time exceeds the reference time and the distance between the first point and the second point exceeds the reference distance, the controller is configured to calculate the correction amount for holding the touch point in the correction amount calculating step of the correcting step.

4. The method of claim 2, wherein when the determination time is equal to or less than the reference time and the distance between the first point and the second point is equal to or less than the reference distance, the controller is configured to calculate the correction amount for holding the touch point in the correction amount calculating step of the correcting step.

5. The method of claim 2, wherein when the determination time exceeds the reference time and the distance between the first point and the second point is equal to or less than the reference distance, the controller is configured to calculate the correction amount for moving down the touch point in the correction amount calculating step of the correcting step.

6. The method of claim 2, wherein when the determination time is equal to or less than the reference time and the distance between the first point and the second point exceeds the reference distance, the controller is configured to calculate the correction amount for moving up the touch point in the correction amount calculating step of the correcting step.

7. The method of claim 2, wherein in the correction amount calculating step of the correcting step, the controller is configured to calculate the correction amount so as to be proportional to the determination time.

8. The method of claim 2, wherein after the correction amount learning step of the correcting step, the controller is configured to calculate learning convergence that is a ratio of the correction amount and an actual correction amount of the touch point actually corrected, calculate a correction coefficient based on the learning convergence and the correction amount, and calculate the correction amount by applying the correction coefficient when the correction amount calculating step is performed again.

9. The method of claim 2, wherein after the correction amount learning step of the correcting step, and when an opening degree of an accelerator position sensor (APS) is smaller than a reference angle or an engine speed is smaller than a reference speed, the controller is configured to calculate a previously mapped additional correction coefficient based on the APS opening degree or the engine speed and apply the previously mapped additional correction coefficient when the correction amount calculating step is performed again to calculate the correction amount.

10. The method of claim 2, wherein after the correction amount learning step of the correcting step, the controller is configured to calculate an additional correction coefficient previously mapped based on a target shift stage when a manual shifting is performed and configured to calculate the correction amount by applying the additional correction coefficient when the correction amount calculating step is performed again.

\* \* \* \* \*